United States Patent
Zhou et al.

(10) Patent No.: US 8,478,266 B1
(45) Date of Patent: Jul. 2, 2013

(54) METHOD AND SYSTEM FOR ANONYMOUS OPERATION OF A MOBILE NODE

(75) Inventors: Tong Zhou, Lower Gwynedd, PA (US); George Jason Schnellbacher, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1311 days.

(21) Appl. No.: 11/370,069

(22) Filed: Mar. 7, 2006

(51) Int. Cl.
*H04W 4/00* (2009.01)

(52) U.S. Cl.
USPC ........... 455/433; 455/411; 713/155; 713/159; 713/161; 713/164; 713/168; 713/169; 713/170; 713/171; 713/172; 713/178; 713/179; 713/185; 380/232; 380/258; 380/277

(58) Field of Classification Search
USPC .................. 455/410, 411, 433; 713/155, 159, 713/161, 164, 168–172, 178, 179, 185; 380/232, 380/258, 277
See application file for complete search history.

(56) References Cited

U.S. PATENT DOCUMENTS

| | | | |
|---|---|---|---|
| 5,537,474 A * | 7/1996 | Brown et al. .................. | 380/248 |
| 6,856,800 B1 | 2/2005 | Henry et al. | |
| 6,925,297 B2 | 8/2005 | Wenzel | |
| 2002/0178385 A1 * | 11/2002 | Dent et al. ...................... | 713/202 |
| 2003/0056096 A1 | 3/2003 | Albert et al. | |
| 2003/0120925 A1 * | 6/2003 | Rose et al. ..................... | 713/176 |
| 2003/0128822 A1 * | 7/2003 | Leivo et al. ................ | 379/93.02 |
| 2003/0229787 A1 | 12/2003 | Gabor | |
| 2004/0073786 A1 | 4/2004 | O'Neill et al. | |
| 2004/0117818 A1 * | 6/2004 | Karaoguz et al. ................ | 725/31 |
| 2004/0203595 A1 * | 10/2004 | Singhal .......................... | 455/411 |
| 2005/0048950 A1 | 3/2005 | Morper | |
| 2005/0133594 A1 * | 6/2005 | Brookner ....................... | 235/383 |
| 2005/0198036 A1 | 9/2005 | Nedkov et al. | |
| 2006/0104252 A1 * | 5/2006 | Song et al. .................... | 370/338 |
| 2006/0174113 A1 * | 8/2006 | Zahari ............................ | 713/168 |
| 2006/0205388 A1 * | 9/2006 | Semple et al. ................. | 455/411 |
| 2007/0005963 A1 * | 1/2007 | Eldar et al. .................... | 713/168 |
| 2007/0174614 A1 * | 7/2007 | Duane et al. ................... | 713/168 |

OTHER PUBLICATIONS

U.S. Department of Commerce/National Institute of Standards and Technology, "Digital Signature Standard (DSS)," Federal Information Processing Standards Publication, FIPS PUB 186-2, Jan. 27, 2000.

Muxiang Zhang and Yuguang Fang, "Security Analysis and Enhancements of 3GPP Authentication and Key Agreement Protocol," IEEE Transactions on Wireless Communications, vol. 4, No. 2, pp. 734-742, Mar. 2005.

(Continued)

*Primary Examiner* — Patrick Edouard
*Assistant Examiner* — Shantell L Heiber

(57) ABSTRACT

A mobile node and its home system generate synchronized time-based codes at periodic time intervals. Each time-based code is valid for a predetermined time period. To facilitate anonymous operation when roaming, the mobile node identifies itself with a coded identifier instead of a public identifier. The coded identifier used at a given time includes the time-based code that is valid for that given time. To authenticate the mobile node, a serving system receives authentication information from the mobile node and forwards the authentication information to a home system. The authentication information includes the current time-based code and a timestamp. The home system identifies the mobile node from the current time-based code and the timestamp. The home system then uses the authentication information to authenticate the mobile node.

6 Claims, 2 Drawing Sheets

OTHER PUBLICATIONS

W. Simpson, "PPP Challenge Handshake Authentication Protocol (CHAP)," Request for Comments 1994, Aug. 1996.

C. Rigney et al., "Remote Authentication Dial in User Service (RADIUS)," Request for Comments 2865, Jun. 2000.

P. Calhoun et al., "Diameter Base Protocol," Request for Comments 3588, Sep. 2003.

P. Calhoun et al., "Diameter Network Access Server Application," Request for Comments 4005, Aug. 2005.

B. Aboba et al., "The Network Access Identifier," Request for Comments 4282, Dec. 2005.

* cited by examiner

METHOD AND SYSTEM FOR ANONYMOUS OPERATION OF A MOBILE NODE

BACKGROUND

1. Field of the Invention

The present invention relates to telecommunications and, more particularly, to methods and systems to facilitate anonymous operation of a mobile node.

2. Description of Related Art

Mobile devices are increasingly using wireless systems to send and receive voice, data, and other media in packet-data form. Such wireless systems may include, for example, wireless local area networks (WLANs) and wireless wide area networks (WWANs). WLANs may use protocols, such as 802.11, HiperLAN, HomeRF, or Bluetooth for air interface communications. WWANs may use protocols, such as EV-DO, cdma2000, EDGE, GPRS, UTMS, or HSDPA for air interface communications.

In many cases, a wireless system will authenticate a mobile device before allowing the mobile device access to packet-data services. The authentication process may be used to verify that the mobile device and its user are, in fact, authorized for packet-data services. The authentication process may use protocols, such as RADIUS or DIAMETER. For example, in order to request access to a packet-data service, the mobile device may transmit authentication information to the wireless system that is currently serving the mobile device. The serving wireless system may then forward the authentication information to an authentication server. The authentication server checks the authentication information and instructs the serving wireless system whether to grant the mobile device access to the requested packet-data service.

One disadvantage with this approach is that it may not be entirely secure. Although some of the authentication information may be encrypted, the authentication information may also include one or more mobile node identifiers that are not. Such mobile node identifiers may include, for example, a mobile directory number (MDN) and/or network access identifier (NAI). Thus, in order to be granted access to packet-data services, a mobile device user may be required to reveal its identity to the serving wireless system and, thus, to anyone with access to the serving wireless system.

Revealing one's identity may be particularly undesirable when the mobile device is roaming, i.e., being served by a wireless system other than its home system. The mobile device user may be unsure as to what the serving system's policies are with respect to using his personal information, i.e., his identity and his use of packet-data services while connected to the serving system. The mobile device user may also be unsure as to how secure the serving system is, i.e., how easily others may access his personal information while connected to the serving system. Security concerns may be particular acute when roaming internationally.

Accordingly, there is a need to provide methods and systems that can enable mobile devices to operate more securely.

SUMMARY

In a first principal aspect, an exemplary embodiment of the present invention provides a method for mobile node identification. In accordance with the method, a mobile node is provided with an algorithm to generate time-based codes that are valid for predetermined times. The mobile node uses the algorithm to generate a current time-based code. The mobile node transmits a message that includes authentication information, wherein the authentication information includes the current time-based code and a timestamp.

In a second principal aspect, an exemplary embodiment of the present invention provides a method for mobile node identification. In accordance with the method, a plurality of public mobile node identifiers is associated with a first plurality of time-based codes. Each time-based code in the first plurality of time-based codes is valid for a first time period. A coded mobile node identifier is received. The coded mobile node identifier is compared to at least one time-based code in the first plurality of time-based codes. A public mobile node identifier is selected from among the plurality of public mobile node identifiers that is associated with a time-based code that matches the coded mobile node identifier.

In a third principal aspect, an exemplary embodiment of the present invention provides a system comprising a data store and a code generation engine communicatively coupled to the data store. The data store stores associations between a plurality of time-based codes and a plurality of public mobile node identifiers. Each time-based code in the plurality of time-based codes is valid for a predetermined time period. The code generation engine generates new time-based codes for the public mobile node identifiers at periodic time intervals.

DETAILED DESCRIPTION OF EXEMPLARY EMBODIMENTS

1. Overview

The present invention, in exemplary embodiments, provides methods and systems that can facilitate the anonymous operation of a mobile node. To operate anonymously, a mobile node may identify itself by using a coded mobile node identifier instead of a public mobile node identifier such as a mobile directory number (MDN) or network access identifier (NAI). The coded mobile node identifier could include a time-based code that is valid for only a particular time period, e.g., a particular 60-second period. The mobile node may generate the time-based code using a coding algorithm that can generate successive time-based codes that are valid for successive time periods.

The mobile node's home system may use the same or similar coding algorithm to generate the same time-based codes for the same time periods as the mobile node. Thus, the time-based codes generated by the mobile node and by the mobile node's home system may be synchronized. In this way, the mobile node can identify itself using a time-based code, instead of a public mobile node identifier, and the mobile node's home system can determine the mobile node's true identity from the time-based code.

In order to be able to determine the mobile node's identity from the time-based code, the home system may maintain time-based codes for all of the home system's mobile nodes that use the anonymous operation feature. Then, when the home system receives a time-based code from a given mobile node, the home system may compare that time-based code to the set of time-based codes that are valid for the same time period to try to find a match. The home system may store the time-based codes so that they are associated with public mobile node identifiers, such as MDN or NAI. In this way, the home system can find the matching time-based code and obtain the corresponding public mobile node identifier to identify the given mobile node.

In an exemplary embodiment, the home system may receive the time-based code from a serving system as part of an authentication process. Thus, once the home system identifies the mobile node from the time-based code, the home system may check other authentication information provided with the time-based code to try to authenticate the mobile node. Upon successful authentication, the home system may send the serving system a series of additional time-based codes that are valid for future time periods. The serving system may use the additional time-based codes to authenticate subsequent communications from the mobile node on a local basis, i.e., without querying the mobile node's home system.

2. Exemplary Network Architecture

Figure 1:
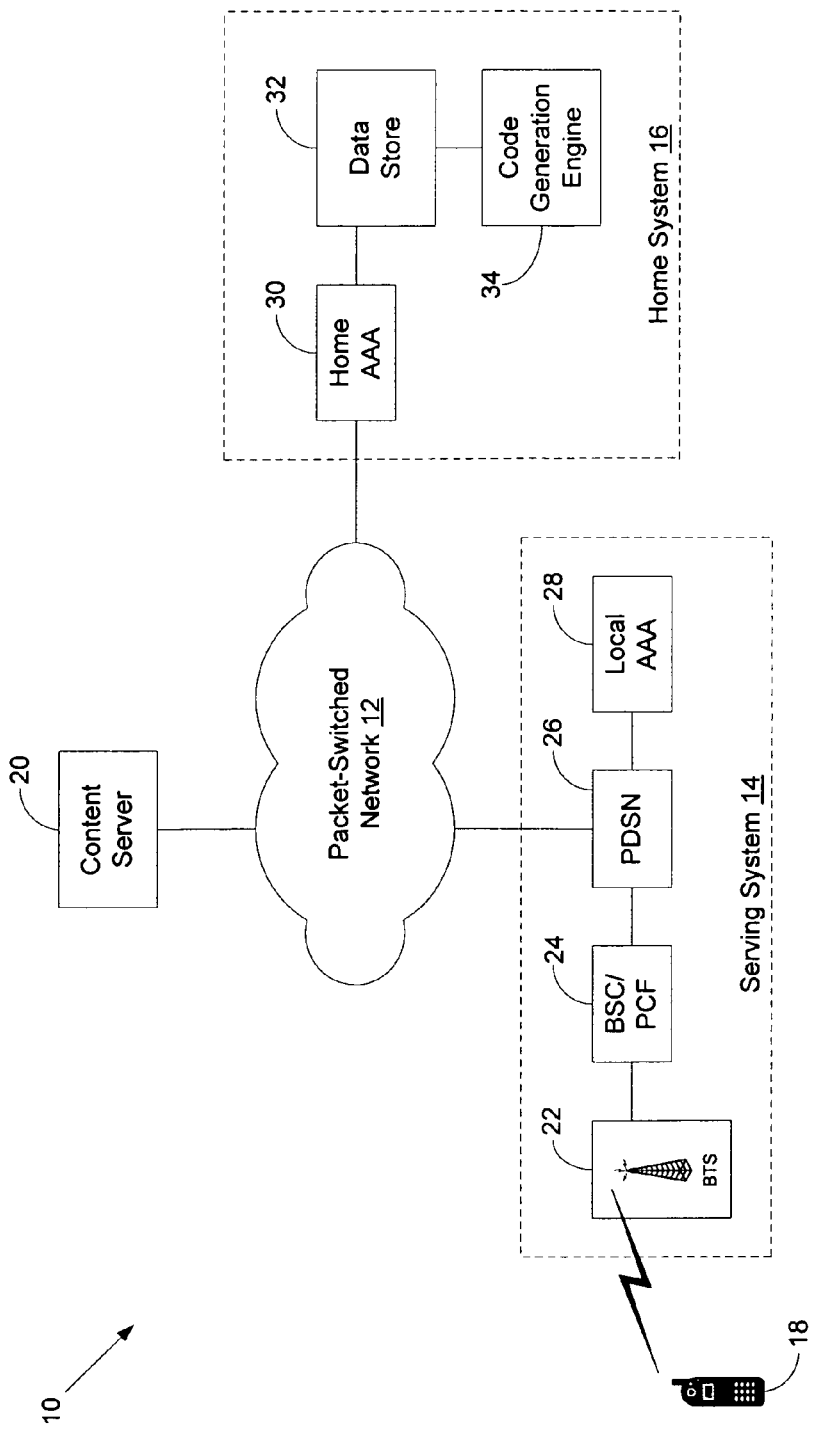
FIG. 1 is a simplified block diagram of a wireless telecommunications network, in accordance with an exemplary embodiment of the present invention.

FIG. 1 illustrates an exemplary wireless telecommunications system 10. System 10 includes a packet-switched network 12 that is communicatively coupled to a serving system 14 and to a home system 16. In the example illustrated in FIG. 1, home system 16 is a home system of a mobile node 18. Mobile node 18 could be a wireless telephone, wireless personal digital assistant (PDA), wirelessly-equipped laptop computer, or other wireless communication device.

Packet-switched network 12 may include one or more public networks, such as the Internet, and/or one or more private networks. Packets may be routed in packet-switched network 12 using protocols such as the Internet Protocol (IP), Transmission Control Protocol (TCP), and the User Datagram Protocol (UDP). Communication sessions may be established through packet-switched network 12 using signaling protocols such as the Session Initiation Protocol (SIP). Content may be requested and transferred through packet-switched network 12 using the HyperText Transfer Protocol (HTTP). Other protocols may also be used to communicate via packet-switched network 12.

Mobile node 18 may communicate with serving system 14, as shown in FIG. 1. For example, mobile node 18 may request access to a packet-data service through serving system 14. The requested packet-data service may involve mobile node 18 transmitting or receiving voice, data, or other media in a packet-data form. For example, mobile node 18 may request voice-over-packet communication with one or more other mobile nodes via packet-switched network 12. As another example, mobile node 18 may request access to one or more content servers, exemplified by content server 20 in FIG. 1, via packet-switched network 12. Mobile node 18 may use either Simple IP or Mobile IP for such packet communications. For Mobile IP, mobile node 18 may register with a home agent in home system 16 and may receive packets via the home agent in home system 16.

Serving system 14 may be a wireless wide area network (WWAN) system, as shown in FIG. 1. Thus, serving system 14 may include one or more base transceiver stations (BTSs), as represented in FIG. 1 by BTS 22. BTS 22 may provide a wireless coverage area within which BTS 22 can communicate with mobile nodes, such as mobile node 18, via an air interface. The communications between mobile node 18 and BTS 22 may use an air interface protocol, such as EV-DO, cdma2000, EDGE, GPRS, UTMS, or HSDPA. BTS 22 may be controlled by a base station controller (BSC) 24 that includes a packet control function (PCF). BSC/PCF 24 may, in turn, be communicatively coupled to a packet-data serving node (PDSN) 26, which may be communicatively coupled to packet-switched network 12. Although serving system 14 is shown in FIG. 1 as a WWAN system, it is to be understood that serving system 14 could alternatively be a wireless local area network (WLAN) system or some other type of wireless system.

Serving system 14 may also include a local authentication server 28. In an exemplary embodiment, local authentication server 28 functions as an authentication, authorization, and accounting (AAA) server. Elements in serving system 14 (e.g., PDSN 26) may communicate with local AAA server 28 in order to authenticate mobile nodes, such as mobile node 18, for access to packet-data services. Such communications may use protocols such as RADIUS or DIAMETER. A recent version of the RADIUS protocol is described in C. Rigney, et al., "Remote Authentication Dial In User Service (RADIUS)," Request For Comments 2865, June 2000, which is incorporated herein by reference.

In some cases, local AAA server 28 may be able to authenticate a mobile node locally. However, if a mobile node is roaming, local AAA server 28 may instead rely on an authentication server in the mobile node's home system, e.g., home AAA server 30 in home system 16, to authenticate the mobile node. To process authentication requests, home AAA server 30 may refer to a data store 32 that stores information regarding mobile node 18 and other mobile nodes that are subscribers of home system 16. In an exemplary embodiment, data store 32 stores associations between the time-based codes for subscriber mobile nodes and one or more public mobile node identifiers (such as MDN and NAI) of those mobile nodes. In this way, data store 32 can receive a time-based code for a subscriber mobile node and determine a corresponding public mobile node identifier for the subscriber mobile node.

Data store 32 may also store other information regarding subscriber mobile nodes, such as electronic serial numbers (ESNs), passwords, and/or various security codes, such as A-key, One Time Key Subsidy Lock (OTKSL), and Master Subsidy Lock (MSL). The information stored in data store 32 for a given mobile node may be keyed to one or more public identifiers for the mobile node, such as MDN and/or NAI. In this way, once a public mobile node identifier is determined from matching a time-based code, data store 32 may then retrieve the mobile node's ESN, password, and/or other information keyed to that public mobile node identifier.

In an exemplary embodiment, data store 32 stores the time-based codes for subscribing mobile nodes that are valid for the current time period. Data store 32 may also store time-based codes for one or more previous time periods. To obtain time-based codes for future time periods, data store 32 may be communicatively coupled to a code generation engine 34. Code generation engine 34 may generate new time-based codes for subscribing mobile nodes (using the same or similar algorithms as used by the mobile nodes) at periodic time intervals. For example, code generation engine 34 may generate new time-based codes every 60 seconds, so that each time-based code is valid for a specified 60-second time period. Data store 32 may then store the time-based codes as they are generated by code generation engine 34.

The time-based codes stored in home system 16 and the time-based codes used by the mobile nodes subscribing to home system 16 may be synchronized. For example, a mobile node and its home system may both regard a particular time-based code as being valid for that mobile node from a specified beginning time, such as 13:45 GMT, until a specified ending time, such as 13:46 GMT. A subscribing mobile node may also occasionally communicate with home system 16 in order to stay synchronized or to re-synchronize.

3. Exemplary Operation

Figure 2:
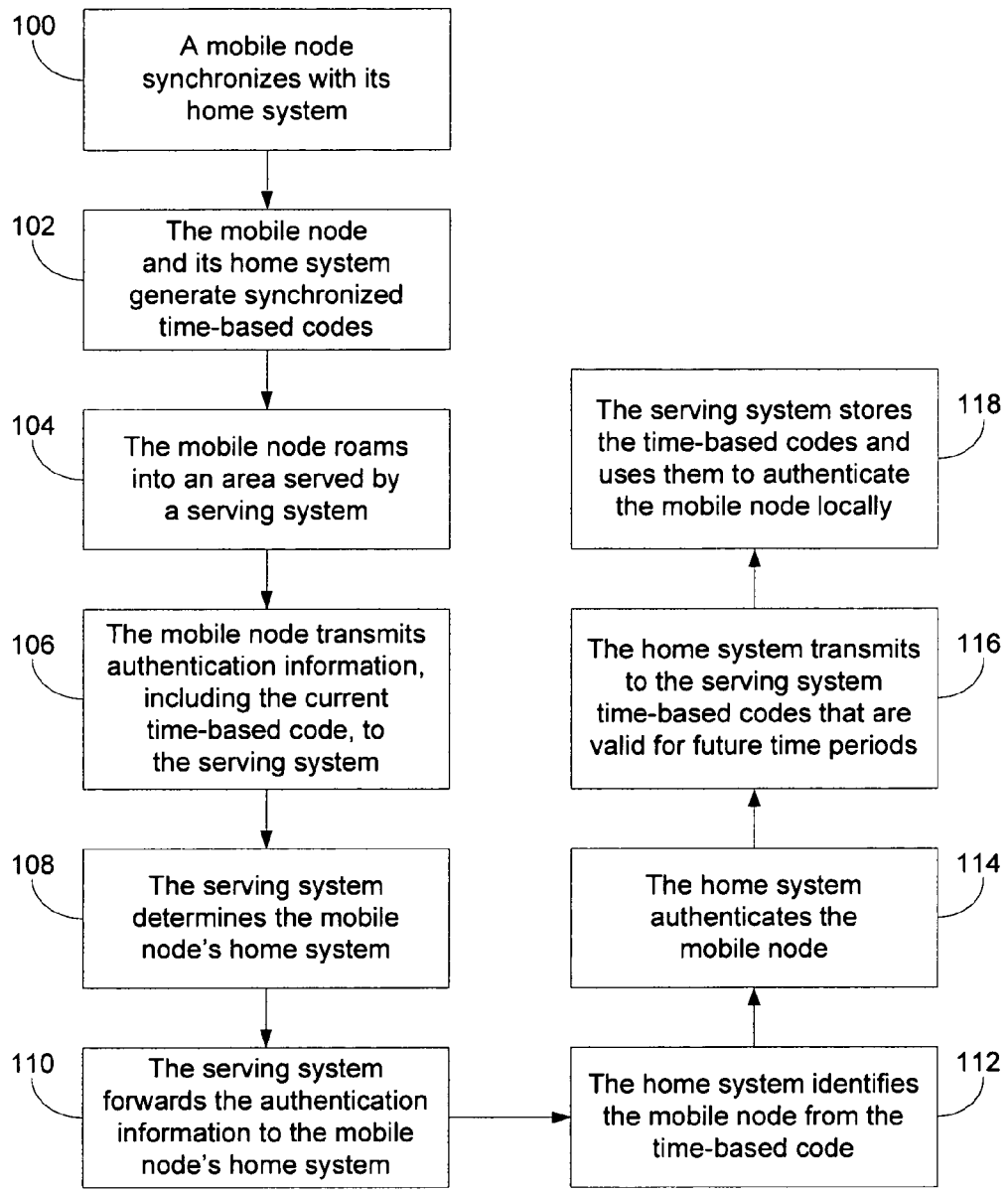
FIG. 2 is a flow chart illustrating a method for anonymous operation of a mobile node, in accordance with an exemplary embodiment of the present invention.

FIG. 2 is a flow chart illustrating an exemplary method for anonymous operation of a mobile node. The method shown in FIG. 2 is described herein with reference to the network architecture shown in FIG. 1. Thus, the method of FIG. 2 assumes that the mobile node, e.g., mobile node 18, has home system 16 as its home system and that the mobile node roams into an area served by a WWAN system, such as serving system 14. It is to be understood, however, that the method of anonymous operation could also be used in other network architectures, for example, when roaming in WLAN systems or other types of serving systems.

The process may begin with the mobile node synchronizing with its home system (e.g., home system 16), as indicated by block 100. This synchronization step could be accomplished, for example, by over-the-provisioning of the mobile node or by having the mobile node log into the home system or a synchronization server in communication with the home system. The result of the synchronization step is that the mobile node and its home system have the same time-based code that is valid for the same time period. For example, the home system might generate the time-based code and then provide it to the mobile node during the synchronization process. Alternatively, the home system might provide the mobile node with a "seed" number that the mobile node could then use to generate the time-based code.

The time-based code could be, for example, a binary string, such as 110110101101 or an alpha-numeric string, such as AEFKS9844823. As described in more detail below, the mobile node can use the time-based code to identify itself, instead of a public identifier such as MDN or NAI, in order to facilitate anonymous operation.

In an exemplary embodiment, the time-based code obtained from the synchronization step is valid for only a limited period of time, e.g., a specific 60-second time period. However, the mobile node may also be able to generate additional time-based codes that are valid for subsequent time periods. To do this, the mobile node may have access to a coding algorithm that is able to generate time-based codes as a function of time, based on, for example, the time-based code and/or "seed" number provided during the synchronization step. The mobile node could be provided with the coding algorithm during the synchronization step. Alternatively, the mobile node could be provisioned with the coding algorithm in advance of the synchronization step.

Preferably, the coding algorithm generates time-based codes that appear to be random, i.e., with no discernible pattern from one time-based code to another. More particularly, the coding algorithm preferably generates time-based codes such that is impossible (or at least impractical) to determine the mobile node's true identity or to predict subsequent time-based codes, without access to the coding algorithm. To accomplish this, the coding algorithm may use a random or pseudorandom number generator that is coupled to a timer. For example, the coding algorithm may include a pseudorandom number generator that is able to deterministically generate a sequence of pseudorandom numbers, based on an initial seed value. The timer may cause the pseudorandom number generator to generate the next pseudorandom number in the sequence at successive time intervals. An example of a suitable pseudorandom number is described in Appendix 3 of U.S. Department of Commerce/National Institute of Standards and Technology, "Digital Signature Standard (DSS)," Federal Information Processing Standards Publication, FIPS PUB 186-2, 2000 Jan. 27, which document is fully incorporated herein by reference. It is to be understood, however, that other pseudorandom or random number generators could be used.

In an exemplary embodiment, the home system uses the same or similar coding algorithm so as to generate the same time-based codes for the same time periods as the mobile node. Thus, at any given time, both the mobile node and home system will have the same time-based code. This feature beneficially allows the mobile node to use a time-based code to identify itself, such that only the mobile node's home system can determine the mobile node's true identity.

Thus, after the synchronization step of lock 100, the mobile node and the mobile node's home system may generate synchronized time-based codes (e.g., at periodic time intervals), as indicated by block 102. In an exemplary embodiment, the mobile node's coding algorithm is able to generate the additional time-based codes without further communication with the home system. However, it may be beneficial for the mobile node to occasionally contact the home system to make sure that the mobile node's and the home system's time-based codes remain synchronized.

It is to be understood that the home system may maintain time-based codes for a plurality of mobile nodes that subscribe to the anonymous operation feature. Preferably, each time-based code uniquely identifies one of the subscribing mobile nodes for a predetermined period of time. Thus, the home system may store the time-based codes associated with the public identifiers of the subscribing mobile nodes, such that the home system can identify the subscribing mobile nodes from their time-based codes.

At some point after the synchronization step, the mobile node may roam into an area served by a serving system (e.g., serving system 14), as indicated by block 104. In the example illustrated in FIG. 2 and described herein, the serving system and the mobile node's home system correspond to different service providers. It is to be understood, however, that the anonymous operation feature could also be used when the serving system and the mobile node's home system correspond to the same service provider.

In order to operate in the serving system's area, the mobile node may transmit authentication information to the serving system, as indicated by block 106. The mobile node may transmit the authentication information in connection with a registration request, data access request, call origination request, in response to a challenge from the serving system, or for some other reason.

In an exemplary embodiment, the authentication information includes the current time-based code. The authentication information may also include a timestamp that indicates the time corresponding to the current time-based code. Thus, the current time-based code may be valid for a time period that encompasses the time indicated by the timestamp. The current time-based code may be provided in the form of a network access identifier (NAI). The format of network access identifiers is described in B. Aboba et al., "The Network Access Identifier," Request for Comments 4282, December 2005, which is incorporated herein by reference. In particular, an NAI may be in the form of "username@realm." In order to avoid revealing its true identity, the mobile node may replace its actual username with the current time-based code. Thus, instead of providing its actual NAI, the mobile node may provide a coded NAI, in which the current time-based code is in the "username" field. The "realm" field may, however, may still identify the mobile node's true home system. Thus, if the current time-based code is QWERT83756D7 and the mobile node's home system is sprintnextel.com, the coded NAI could be QWERT83756D7@sprintnextel.com.

The authentication information could also include other information. For example, the authentication information could include a hash value that the mobile node generated from hash input using a hashing algorithm. The hash input could include, for example, the current time-based code, the timestamp, the mobile node's true NAI and/or MDN, the mobile node's ESN, and/or a password. The authentication information could also include other types of information. In an exemplary embodiment, however, the authentication information does not include any public identifier of the mobile node, except in encrypted form.

The serving system receives the authentication information and determines the mobile node's home system, as indicated by block 108. For example, PDSN 26 may receive the authentication information and include it in a RADIUS Access-Request message to local AAA server 28. Local AAA server 28 could then check the "realm" field of the coded NAI to determine the mobile node's home system and, thus, whether local AAA server 28 can authenticate the mobile node locally. In this case, the "realm" field of the coded NAI indicates that home system 16 is mobile system's home system, which means that local AAA server 28 cannot authenticate the mobile node locally. As a result, the serving system forwards the authentication information to the mobile node's home system, as indicated by block 110. For example, local AAA server 28 in serving system 14 may forward the Access-Request message to home AAA server 30 in home system 16.

The home system receives the authentication information and identifies the mobile node, as indicated by block 112. To identify the mobile node, home AAA server 30 may provide the time-based code in the coded NAI and the timestamp to data store 32. Data store 32 may then refer to the set of stored time-based codes that are (or were) valid for the time period that encompasses the time indicated by the time stamp, and compare the time-based code in the coded NAI to those stored time-based codes to see if there is a match. If there is a match, data store 32 may identify the mobile node by providing home AAA server 30 with a public identifier of the mobile node (e.g., NAI or MDN) that is associated with the matching time-based code.

Once the home system has identified the mobile node, the home system may analyze other information in the authentication information to authenticate the mobile node, as indicated by block 114. For example, home AAA server 30 may use the mobile node's public identifier to look up other information in data store 32 to use as input to a hashing algorithm. For example, home AAA server 30 may look up the mobile node's ESN and password. Home AAA server 30 may then generate an expected hash value and compare the expected hash value to the hash value provided in the authentication information. If there is a match, then authentication is successful, and the home system may indicate the successful authentication to the serving system. For example, home AAA server 30 may transmit a RADIUS Access-Accept message to local AAA server 28. In response to this successful authentication, the serving system may grant access or otherwise allow the operation requested by the mobile node.

Upon successful authentication, the home system may also transmit to the serving system a certain number of time-based codes that are valid in future time periods, as indicated by block 116. For example, if each time-based code is valid for one minute, the home system may provide sixty future time-based codes so as to cover the next hour. The serving system may store the time-based codes so that the serving system can authenticate the mobile node locally (i.e., without additional involvement from the home system) during the time period covered by the future time-based codes, as indicated by block 118.

In this way, a mobile node may be able to operate anonymously while roaming. In particular, the mobile node may avoid revealing its true identity to the serving system by instead using a coded identifier that includes a time-based code to identify itself. By maintaining time-based codes that are synchronized to the mobile node's time-based codes, the mobile node's home system can determine the mobile node's true identity from the time-based code that a mobile node uses to identify itself. The home system is then able to authenticate the mobile node, even though the mobile node is operating anonymously.

Because the serving system is unaware of the mobile node's true identity, the serving system may use the time-based code to identify the mobile node, e.g., in call detail records. For example, the serving system may include the time-based code used at the start and at the stop of each active session in call detail records. The home system may also include the time-based codes in call detail records so that the home system's call detail records can be correlated with the serving system's call detail records.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for mobile node authentication, said method comprising:
    storing a plurality of time-based codes for each of a plurality of time periods;
    a home system receiving from a serving system a request to authenticate a mobile node, wherein said serving system is configured to provide a packet-data service to said mobile node, and wherein said authentication request includes authentication information provided by said mobile node, said authentication information including a coded mobile node identifier and a timestamp associated with said coded mobile node identifier;
    said home system referring to those of said stored time-based codes that are valid for a time period that encompasses a time indicated by said timestamp and comparing said coded mobile node identifier to those time-based codes to find a matching time-based code; and
    said home system identifying said mobile node based on said matching time-based code;
    said home system authenticating said mobile node; and
    said home system transmitting an authentication response to said serving system, said authentication response including a plurality of time-based codes that are valid for said mobile node for a plurality of future time periods.

2. The method of claim 1, wherein storing a plurality of time-based codes for each of a plurality of time periods comprises:
    generating a first plurality of time-based codes that are valid for a first time period;
    generating a second plurality of time-based codes that are valid for a second time period; and
    storing said first plurality of time-based codes and said second plurality of time-based codes in a data store.

3. The method of claim 1, wherein said authentication request further includes a mobile-node hash value.

4. The method of claim 3, wherein said home system authenticating said mobile node comprises:
   determining hash input for said mobile node;
   generating an expected hash value for said mobile node by applying a hashing algorithm to said hash input;
   comparing said mobile-node hash value to said expected hash value; and
   determining that said mobile-node hash value matches said expected hash value.

5. A system for a plurality of subscriber mobile nodes, said system comprising:
   a data store, wherein said data store stores current time-based codes that are valid for said subscriber mobile nodes for a current time period and previous time-based codes that are valid for said subscriber mobile nodes for a previous time period;
   an authentication server communicatively coupled to said data store, said authentication server being configured to (i) authenticate a particular mobile node in said plurality of subscriber mobile nodes based on authentication information provided by said particular mobile node, said authentication information including a time-based code and a timestamp, and (ii) transmit to a serving system configured to provide a packet-data service to said particular mobile node a plurality of future time-based codes that are valid for said particular mobile node in future time periods, upon successful authentication of said particular mobile node; and
   a code generation engine communicatively coupled to said data store, wherein said code generation engine is configured to generate time-based codes that are valid for said subscriber mobile nodes, including said plurality of future time-based codes that are valid for said particular mobile node.

6. The system of claim 5, wherein said data store is configured to store time-based codes as they are generated by said code generation engine.

* * * * *